US006813312B2

(12) United States Patent
Tullberg et al.

(10) Patent No.: US 6,813,312 B2
(45) Date of Patent: **\*Nov. 2, 2004**

(54) DATA STORAGE AND REDUCTION METHOD FOR DIGITAL IMAGES, AND A SURVEILLANCE SYSTEM USING SAID METHOD

(75) Inventors: Joacim Tullberg, Lund (SE); Carl-Axel Alm Pettersson, Lund (SE)

(73) Assignee: Axis, AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,874

(22) Filed: Feb. 3, 1999

(65) Prior Publication Data

US 2003/0133593 A1 Jul. 17, 2003

(30) Foreign Application Priority Data

Jan. 29, 1999 (SE) .............................................. 9900325

(51) Int. Cl.[7] .............................. H04N 7/12; H04N 7/18
(52) U.S. Cl. .................................. 375/240.01; 348/143
(58) Field of Search ................................. 340/500, 501, 340/517, 540, 541, 506, 825.36; 348/143, 148–155, 158, 159, 714–716, 718; 375/240.01, 240.12; 382/248, 250, 251; H04N 7/12, 7/18

(56) References Cited

U.S. PATENT DOCUMENTS

| 4,281,354 A | * | 7/1981 | Conte ......................... 348/148 |
|---|---|---|---|
| 4,673,974 A | * | 6/1987 | Ito et al. ....................... 348/159 |
| 4,777,526 A | * | 10/1988 | Saitoh et al. ................ 348/159 |
| 5,072,296 A | | 12/1991 | Lim |
| 5,166,987 A | * | 11/1992 | Kageyama .................. 382/250 |
| 5,471,239 A | * | 11/1995 | Hill et al. .................... 348/155 |
| 5,689,442 A | * | 11/1997 | Swanson et al. ............ 348/143 |
| 5,724,475 A | | 3/1998 | Kirsten |
| 5,751,345 A | * | 5/1998 | Dozier et al. ................ 348/153 |
| 5,798,798 A | * | 8/1998 | Rector et al. ................ 348/588 |
| 6,107,918 A | * | 8/2000 | Klein et al. .................. 340/506 |
| 6,144,797 A | * | 11/2000 | MacCormack et al. ....... 386/46 |
| 6,271,752 B1 | * | 8/2001 | Vaios .......................... 348/155 |

FOREIGN PATENT DOCUMENTS

JP   11-168685   6/1999

* cited by examiner

Primary Examiner—Richard Lee
(74) Attorney, Agent, or Firm—IP Creators; Charles C Cary (57) ABSTRACT

A data storage and reduction method for digital images having a chronological order involves storing a first and chronologically new image or group of images at a first image quality requiring a first amount of storage space, and processing a second image or group of images, chronologically older than said first image or group of images, by reducing the image quality thereof to a second image quality requiring a second amount of storage space, which is less than said first amount of storage space. Advantageously, the method is used for a surveillance system, comprising a camera, a digital storage device and an image storage controller, wherein image quality is reduced for old or otherwise less important images or groups of images, thereby obtaining additional storage space for allowing more important images (such as images relating to an alarm event) to be stored at higher image quality, while retaining an extended total recording time span.

3 Claims, 9 Drawing Sheets

DATA STORAGE AND REDUCTION METHOD FOR DIGITAL IMAGES, AND A SURVEILLANCE SYSTEM USING SAID METHOD

TECHNICAL FIELD

The present invention generally relates to a data storage and reduction method for digital images having a chronological order. More particularly, the present invention relates to a surveillance system using such a method and having a camera, a digital storage device and an image storage controller operatively connected to the camera and the storage device for receiving a plurality of images from the camera and storing the images digitally in the storage device, the images having a chronological order reflecting the points of time, at which the images were produced. The invention also relates to a method of storing such digital images.

BACKGROUND ART

Surveillance camera systems are commonly used for monitoring various areas in place of business, such as cashier windows at a bank or gambling tables at a casino. Traditionally, such surveillance systems have included analog video cameras, which continuously record all activities within a surveillance zone on a magnetic tape cassette, such as a standard VHS cassette. Typically, such cassettes have a nominal recording time of a few hours, e.g. 2, 4 or 8 hours. When the tape cassette has been fully recorded, the cassette will have to be substituted by an empty one by a human operator.

The maximum recording time may be increased by reducing the speed, at which the magnetic tape is moved in relation to the recording head, thereby reducing the number of frames stored per second. In this way the maximum recording time for a standard VHS tape may be extended to e.g. 48 hours, thereby obviously also extending the time between cassette substitution correspondingly. However, the penalty for not having to switch tapes as frequently is a substantial reduction in image quality for the entire recording time.

In recent years, digital video cameras have entered the market. Such cameras produce a sequence of digital snapshot images or still images at a constant rate. For instance, European-type cameras produce images at a rate of 25 images or frames per second (fps), while US-type cameras operate at 30 fps. When the sequence of images is played back, the rapid switch between images is transparent to a human observer. Instead, the sequence of snapshot images is experienced as a continuous stream of moving images.

The output of digital cameras is stored on an appropriate storage medium, such as a magnetic disk (hard disk), an optical disk (CD, DVD) or a digital magnetic tape (DAT). Similarly, the output of analog cameras may be digitised into a sequence of digital images to be stored on such a storage medium.

The images are usually compressed by way of a data compression algorithm, such as JPEG, MPEG, wavelet or fractal compression, wherein certain image information is eliminated and the amount of storage space is reduced accordingly. Since each digital image anyway requires a substantial amount of storage space (typically 10 to 1000 KB), even if a high-density, state-or-the-art digital storage medium is employed, all available storage space will eventually be consumed by the sequence of images produced by the camera. In such a situation, one option is to manually switch to another digital storage medium with free storage space, for instance by having an operator exchange a magnetic disk, an optical disk or a digital tape cassette.

However, being dependent of a human operator for regularly providing additional storage space is undesired in many applications, particularly in applications where the surveillance system is to be used during non-office hours, for instance during evenings or nights.

An obvious way of automatically handling situations, where the currently used storage medium have become completely or almost completely filled with digital images, is to sacrifice the oldest images on a first-in-first-out (FIFO) basis, so that the storage space occupied by such old images are continuously reused for storing new images.

However, this approach has at least two drawbacks, the first of which being the limited preservation of historic image information. Every storage medium has a maximum amount of storage space available for storing digital information. Irrespective of the actual value of the maximum amount of storage space, each storage medium will only be able to store a certain number of images, this number being dependent of the maximum storage capacity of the storage medium, the pixel resolution of each image, and the frequency or rate (fps) of these images. For instance, if a particular storage medium is only capable of storing a sequence of images corresponding to e.g. two hours of recording time, then all events that have occurred more than two hours ago will be completely and irrevocably lost, when such an automatic procedure for reusing storage space is employed.

A second drawback is that such an automatic FIFO procedure inherently operates under the assumption that the oldest image information is always the least important. However, in many situations certain older image information may actually be of higher importance than certain younger image information, for instance if an alarm situation has occurred and has been incorporated in such older image information.

SUMMARY OF THE INVENTION

It is an object of the present invention to provide a substantial improvement to camera-based surveillance systems. In particular, an object of the invention is to chronologically extend the scope of image information recorded and stored by a surveillance camera system, so that chronologically old image information may be kept for a longer period of time than with the prior art systems.

A further object is to provide enhanced representation of images related to a historic alarm event. Yet another object is to provide an option for a user of the system to dynamically define the chronological image information coverage provided by the system.

Generally, the objects above are achieved by storing new digital images at a high image quality and provide time-dependent reduction in image quality for certain older images or groups of images, thereby reducing the storage space required for such certain images.

More particularly, the main objects of the invention are achieved by a data storage and reduction method for digital images having a chronological order, wherein a first and chronologically new image or group of images is/are stored at a first image quality requiring a first amount of storage space, and wherein a second image or group of images, chronologically older than said first image or group of images, is processed by reducing the image quality thereof to a second image quality requiring a second amount of storage space, which is less than said first amount of storage space.

The main objects of the present invention are also achieved for a surveillance system comprising a camera, a digital storage device and an image storage controller operatively connected to the camera and the storage device for receiving a plurality of images from the camera and storing the images digitally in the storage device, the images having a chronological order reflecting the points of time, at which the images were produced, by providing the image storage controller with: first means for determining a qualitative value for individual images, or groups of images, stored in the storage device, the qualitative value being a function of a chronological position of the respective image or group of images; second means for selecting, among the images stored in the storage device, a particular image or group of images in response to its qualitative value; and third means for compressing or deleting said particular image or group of images.

Other objects, advantages and features of the present invention will be apparent when studying the following detailed disclosure, the appended claims as well as the attached drawings.

BRIEF DESCRIPTION OF THE DRAWINGS

The invention will be described in more detail in the following, reference being made to the accompanying drawings, in which.

DETAILED DISCLOSURE

Figure 1:
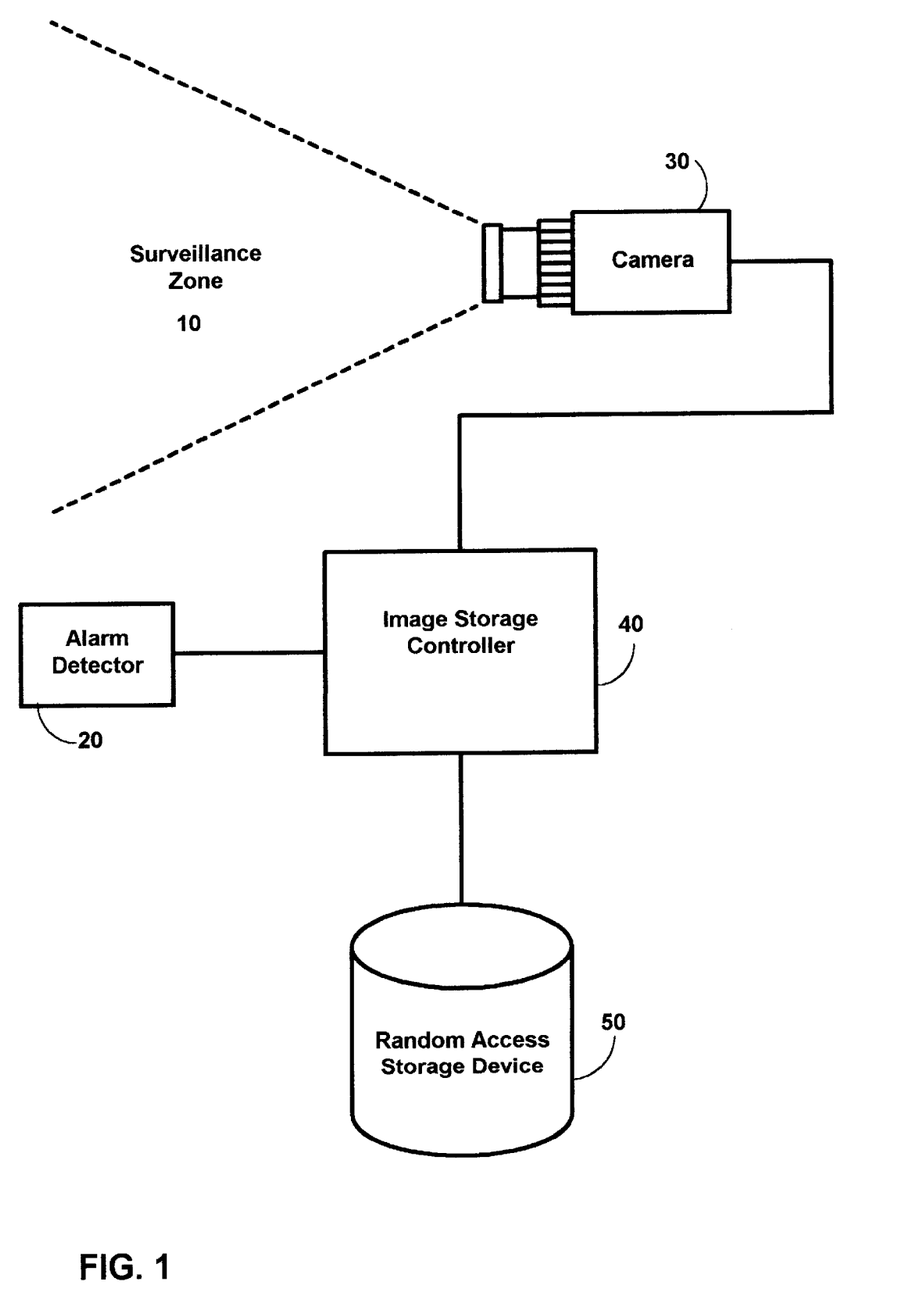
FIG. 1 is a schematic block diagram illustrating a surveillance system according to a preferred embodiment.

FIG. 1 is an overall view of a surveillance system according to a preferred embodiment of the invention. A camera 30 is arranged to monitor a surveillance zone 10, which may be any given volume or area, which for some reason it is desired to monitor. Hence, the surveillance zone may be a selected part of a bank, a post office, a casino, a factory, office premises, a prison, a criminal custody or detention room, a police station, a house garden, a garage or any other area of surveillance. For the following disclosure the camera 30 is assumed to be a digital video camera, i.e. a camera which is arranged to provide a sequence of snapshot or still images at a predetermined rate, such as 25 fps. However, the camera 30 may equally well be a conventional analog camera, providing analog video output, which is converted into digital images by a commercially available image digitiser. The camera 30 is connected to an image storage controller 40, which may be implemented by any commercially available computer, such as a PC-compatible computer, or a stand-alone device comprising hardware and software logic for providing the functionality described in more detail below. Alternatively, the image storage controller may be implemented by electronic circuitry inside the camera 30.

The image storage controller 40 is operatively connected to a random access storage device 50, such as a hard disk or other digital storage media. The system may also comprise an alarm detector 20, which is operatively connected to the image storage controller 40 and is arranged to detect an abnormal situation occurring within or outside the surveillance zone 10. The alarm detector 20, which will be described in more detail below, may for instance be a commercially available infrared movement detector, smoke detector, humidity detector, magnetic door- or window-mounted sensor, acoustical sensor, laser detector, manually operated alarm button, etc.

Figure 2A:
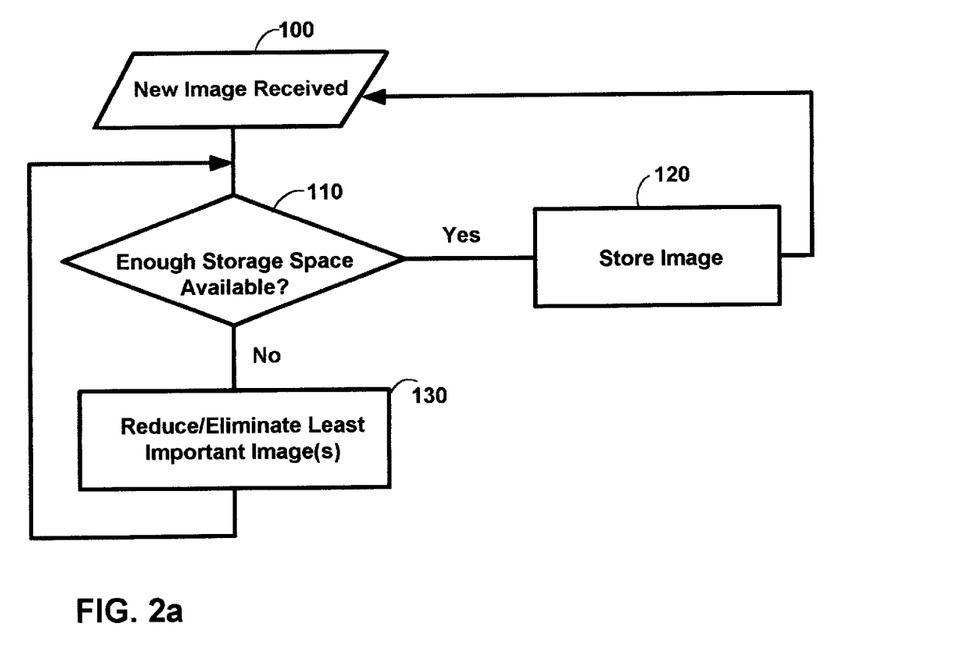
FIG. 2a is a schematic flow diagram of the main steps of a method according to the invention.

FIG. 2a illustrates the overall operating principle of the surveillance system shown in FIG. 1. The camera 30 is arranged, as previously mentioned, to produce a continuous sequence of digital images, representing snap shots of the momentary situation within the surveillance zone 10 at regularly distributed moments of time. Preferably, the camera 30 produces images at a constant rate, such as 25 fps (frames or images per second). The images produced by the camera 30 are sequentially supplied to the image storage controller 40, which receives each new image at a step 100.

In a step 110 the image storage controller 40 determines whether there is currently enough storage space available in the storage device 50. If the answer is in the affirmative, control is transferred to a step 120, wherein the new image is forwarded to the storage device 50 and stored therein. If, on the other hand, it has been determined, in step 110, that there is not enough storage space available, then control is transferred to a step 130. Step 130, which represents a key element of the present invention, will be thoroughly described in the following sections. In summary, the task of step 130 is to evaluate the importance of individual images or groups of images already stored in the storage device 50, select one or more than one of these images to be "sacrificed" and then either reduce the quality of the image(s) or completely eliminate it/them. The purpose is to release some storage space, which is large enough for storing a new image received at step 100. After having released the storage space, control is returned to step 110 for checking whether the storage space thus released is enough for storing the new image, i.e. whether there is now enough storage space available in the storage device 50.

Figure 2B:
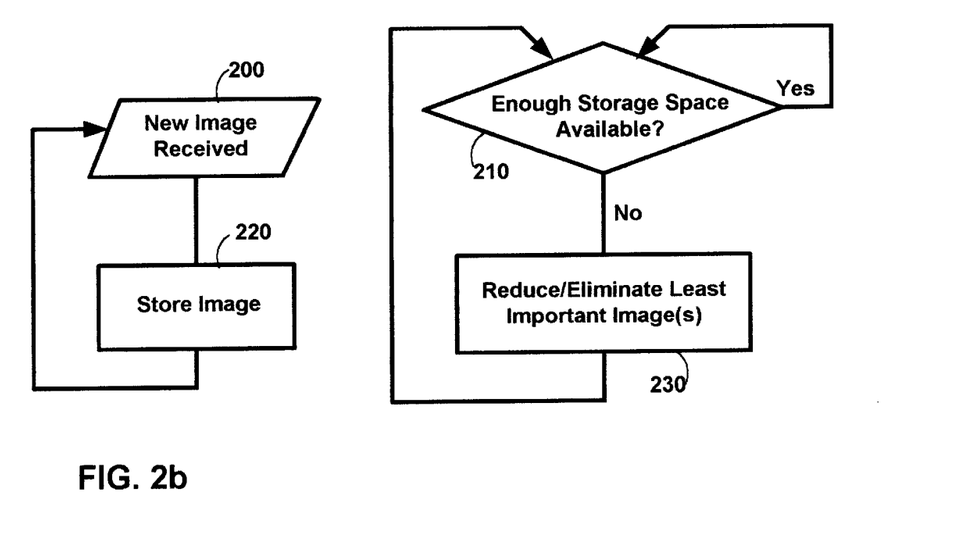
FIG. 2b illustrates an alternative to the flow diagram of FIG. 2a, FIG. 3 is a block diagram illustrating the main components of the preferred embodiment of the surveillance system.

As an alternative to the overall operating principle of FIG. 2a, the operation may be divided into two separate processes, as shown in FIG. 2b. The first process is an endless loop, where new images are received in a step 200 and stored in the storage device in a step 220. Subsequently, control is transferred back to step 200, and the procedure is repeated, as soon as the next new image arrives from the camera 30. In a second process, which is independent from the first process, it is determined in a step 210 whether there is enough storage space available in the storage device 50, e.g. whether the free or non-used storage space is above or below a predetermined threshold value. If the result of the determination in step 210 is in the affirmative, control is immediately transferred back to the beginning of step 210. Otherwise, a step 220 is executed, which fully corresponds to step 130 described in connection with FIG. 2a. Subsequently, control is transferred back to the beginning of step 210, wherein an endless procedure is formed by steps 210 and 230.

Figure 3:
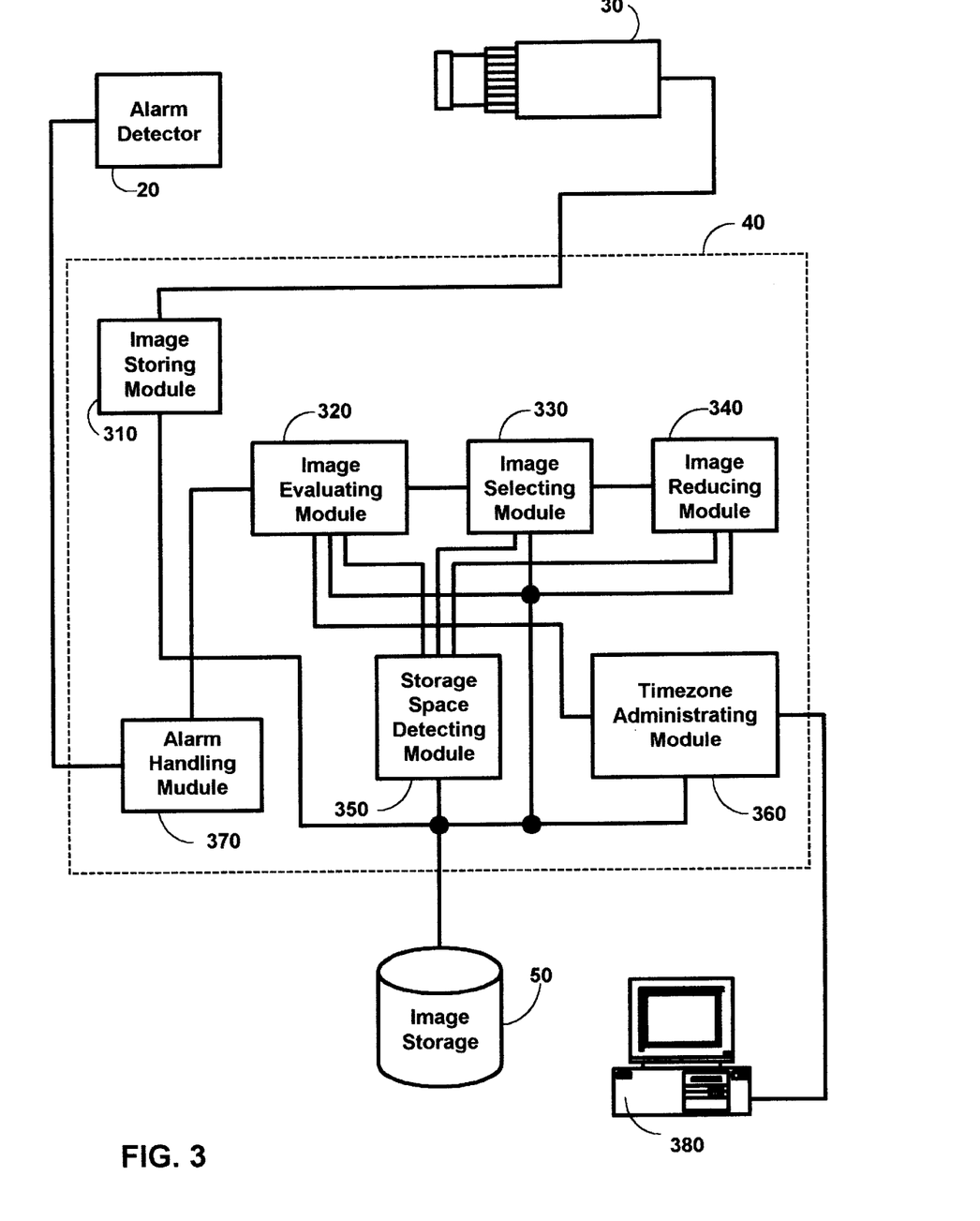

In FIG. 3 the main components of the image storage controller 40 are illustrated. An image storing module 310 is arranged to receive the sequence of new images from the camera 30 and to store these images sequentially in the storage device 50. The image storage controller 40 further comprises an image evaluating module 320, an image selecting module 330 and an image reducing module 340, all of which are arranged to perform the operations of step 130 or 230 in FIGS. 2a and 2b. The image storage controller 40 also comprises a storage space detecting module 350, which is operatively connected to the image evaluating module 320, the image selecting module 330, the image reducing module 340 and the image storage device 50. A timezone administrating module 360 is operatively connected to the image evaluating module 220, the image storage device 50 and a device 380 for user interaction. The latter may for instance be a computer or any other device with input/output means, such as a key pad, a monitor, a cursor control device, a joystick, etc.

Finally, an alarm handling module 370 is operatively connected to the alarm detector 20 and to the image evaluating module 320. Apart from the modules described above, the image storage controller 40 comprises controller means for controlling the individual operation of the modules 310–370 as well as all interaction between these modules and with the camera 30, the alarm detector 20, the image storage device 50 and the user interaction device 380. The controller means may be implemented as a separate module not disclosed in FIG. 3, or alternatively the functions of the controller means may be implemented by either of the modules 310–370. Furthermore, all parts of the image storage controller 40 may be realized as software routines executed on any device capable of executing computer programs. Alternatively, some or all of the above modules may be implemented as various pieces of hardware, such as integrated semiconductor circuits, logical gates, discrete analog or digital components, memory components, etc.

Next, three preferred embodiments of the present invention will be described in detail.

First Embodiment

According to a first embodiment of the present invention the coverage of chronologically old (historic) video image data is extended by eliminating a fraction of the images belonging to such chronologically older information, i.e. by reducing the number of frames per second (fps) for certain old video image data. The user or administrator of the surveillance system may specify a timezone table via the user interaction device 380 and the timezone administrating module 360. For instance, a user-defined timezone table may look like this:

| Timezone | fps | Start time (minutes) |
|---|---|---|
| 1 | 25 | 0 |
| 2 | 15 | 60 |
| 3 | 2 | 180 |
| 4 | 0 | 1863 |

The timezone table above may be useful for instance if the time between guard rounds is approximately 30 minutes, and it is therefore preferred to have 1 h video storage at full quality, e.g. 25 fps. When the surveillance system is initially started, the image storage device 50 will be filled with video image data at full quality, i.e. 25 fps.

Once it has been determined in step 110 or 210, by the storage space detecting module 350, that the available storage space in the storage device 50 is below a predetermined threshold value, the image evaluating module 320, the image selecting module 330 and the image reducing module 340 will start processing the older portions of the video image sequence stored in the storage device 50. Assuming that the storage device 50 is capable of storing 399,960 images, and assuming that images are initially stored at maximum fps, in this case 25 fps, then the storage device 50 will become full just before 267 minutes of video images have been stored. At that occasion, the image evaluating module 320 accesses the timezone table managed by the timezone administrating module 360 and finds out that video image data older than 60 minutes is to be reduced to 15 fps. The image evaluating module 320 requests the image selecting module 330 to execute the required reduction in video quality for images older than 60 minutes. Consequently, the image selecting module 330 identifies the (25−15)/25=40% of the images that are older than 60 minutes and have to be discarded. The image reducing module 340 is called upon to execute the deletion of 10 images among the originally 25 images within each second of video data.

Next, when step 110/210 again has determined, that there is almost no storage space available in the storage device 50, the image evaluating module 320, the image selecting module 330 and the image reducing module 340 will reduce the fps value from 15 to 2 for images older than 180 minutes. In this way, the storage device 50 will be able to maintain video image data, which is as old as 1863 minutes, as compared to 267 minutes of maximum storage time, had all images been stored at 25 fps. Naturally, the price for achieving such a substantial extension of the maximum storage time is that the video image quality is reduced for older images. However, for surveillance purposes, even a video image quality of 2 fps will often be sufficient to identify relevant information contained in these video images.

Figure 4:
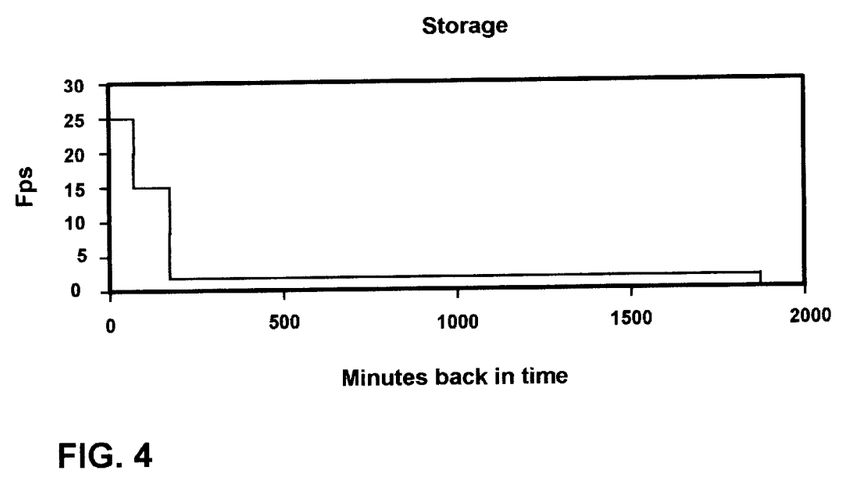
FIGS. 4, 5a–5e and 6a–6e are graphical illustrations of different momentary image storage schedules.
Figure 5A:
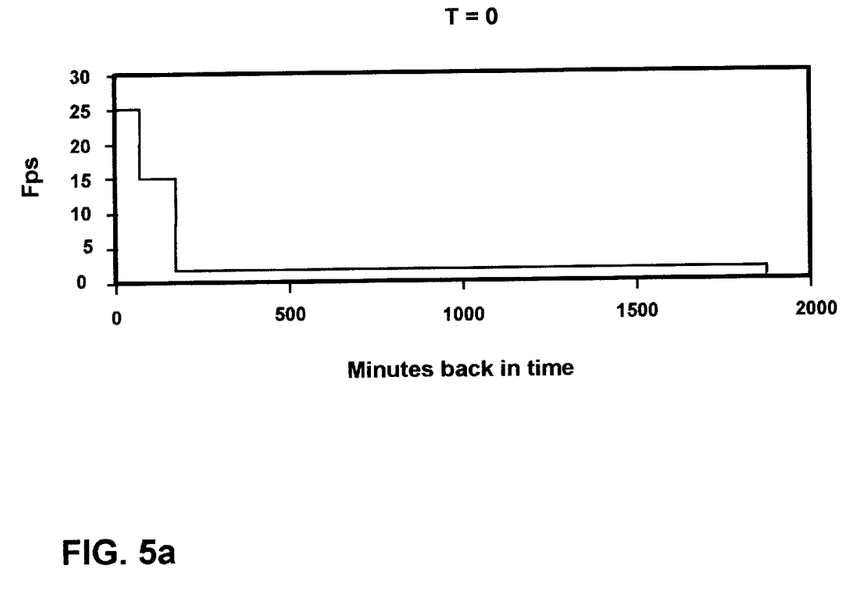
Figure 5B:
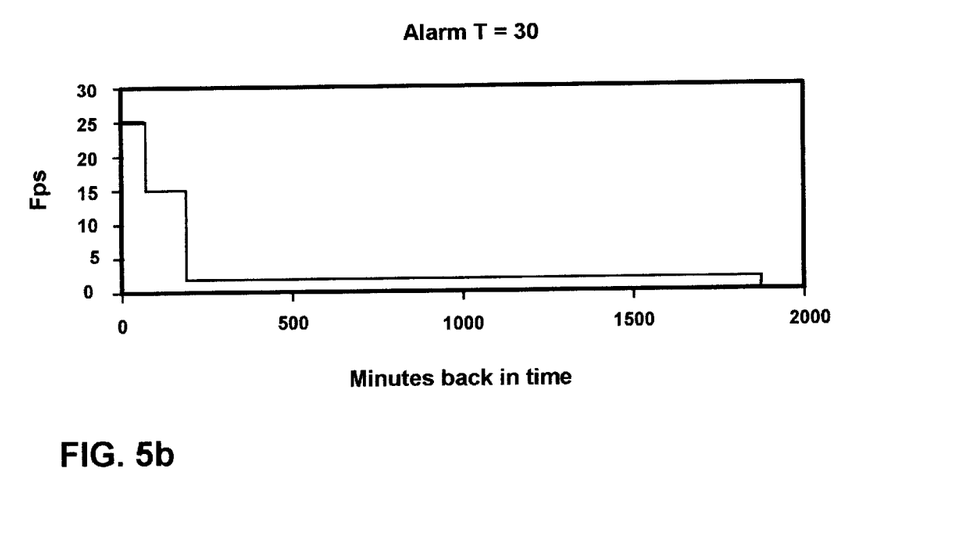
Figure 5C:
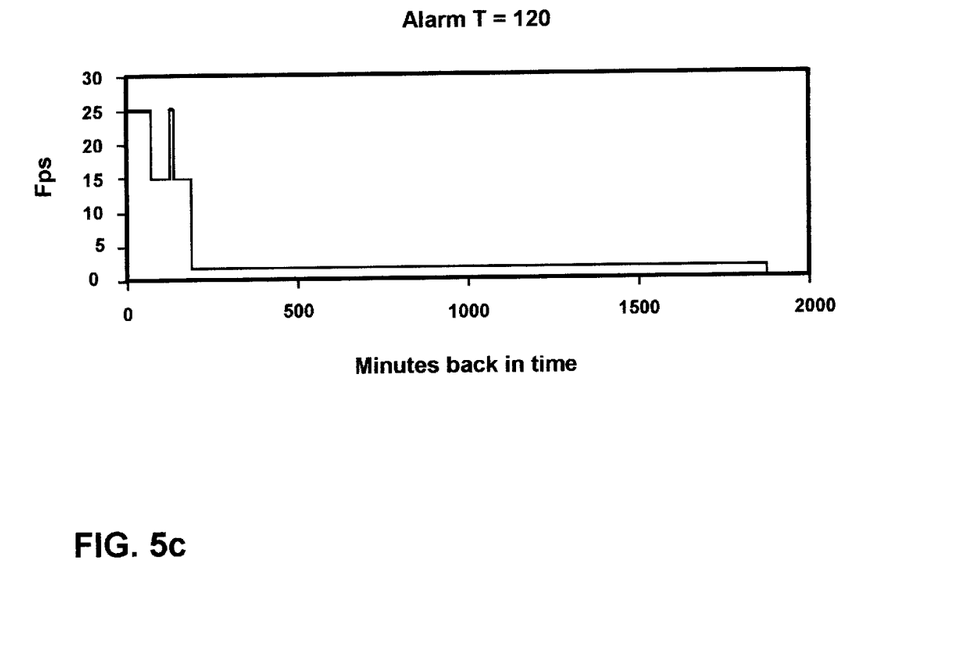
Figure 5D:
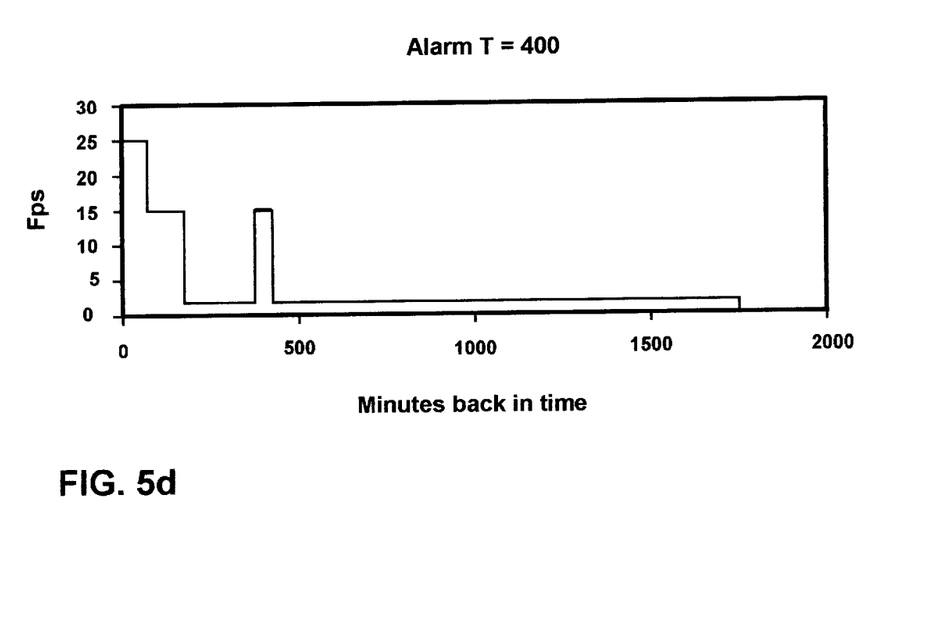
Figure 5E:
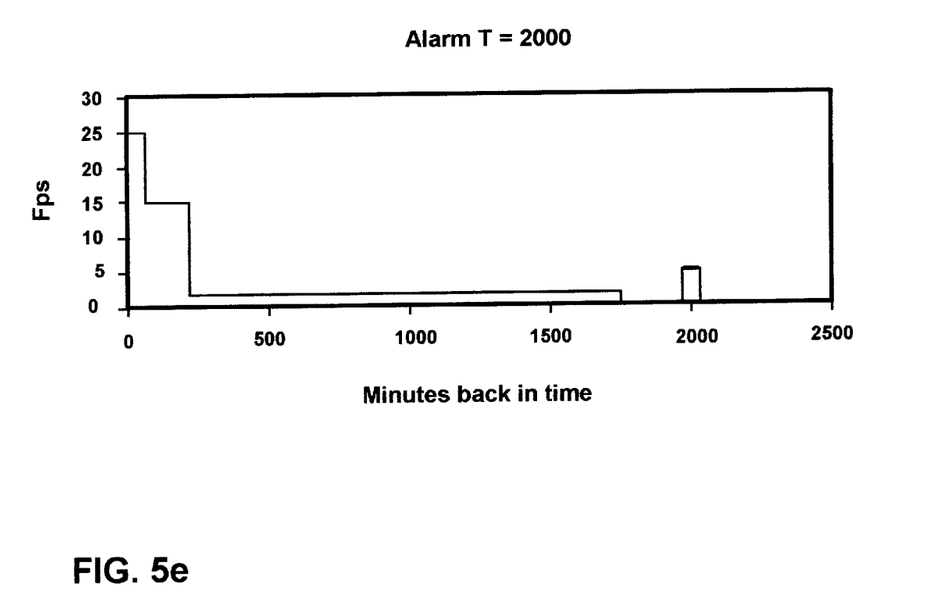
Figure 6A:
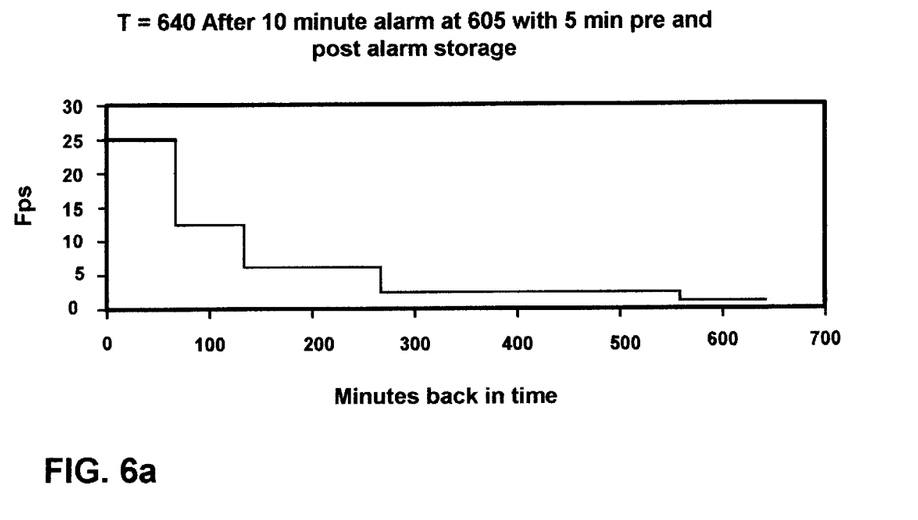
Figure 6B:
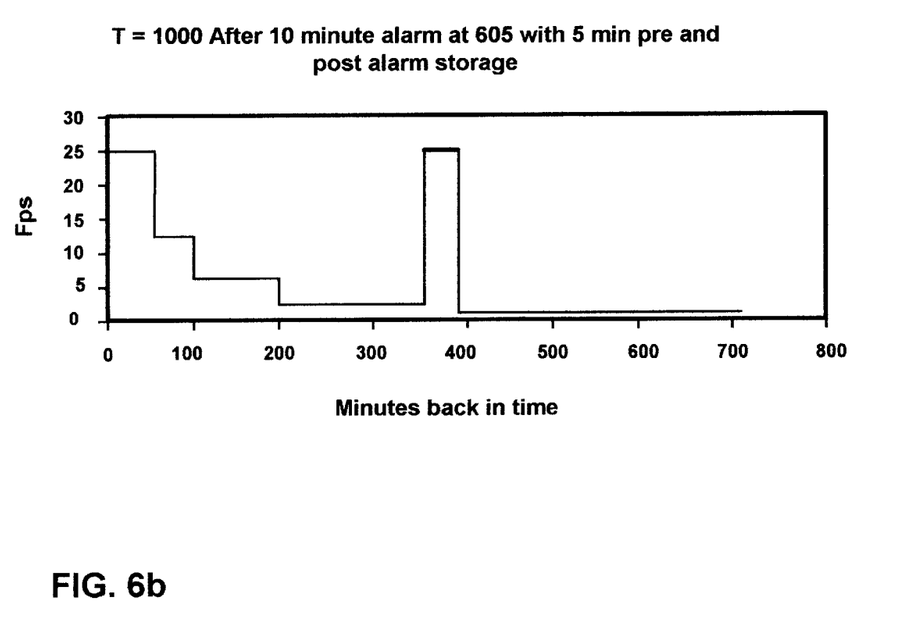
Figure 6C:
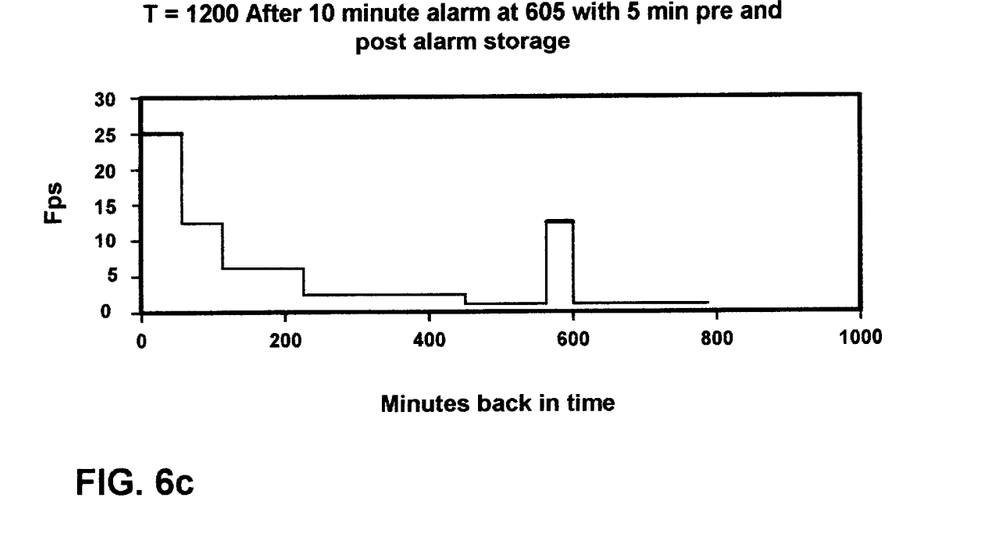
Figure 6D:
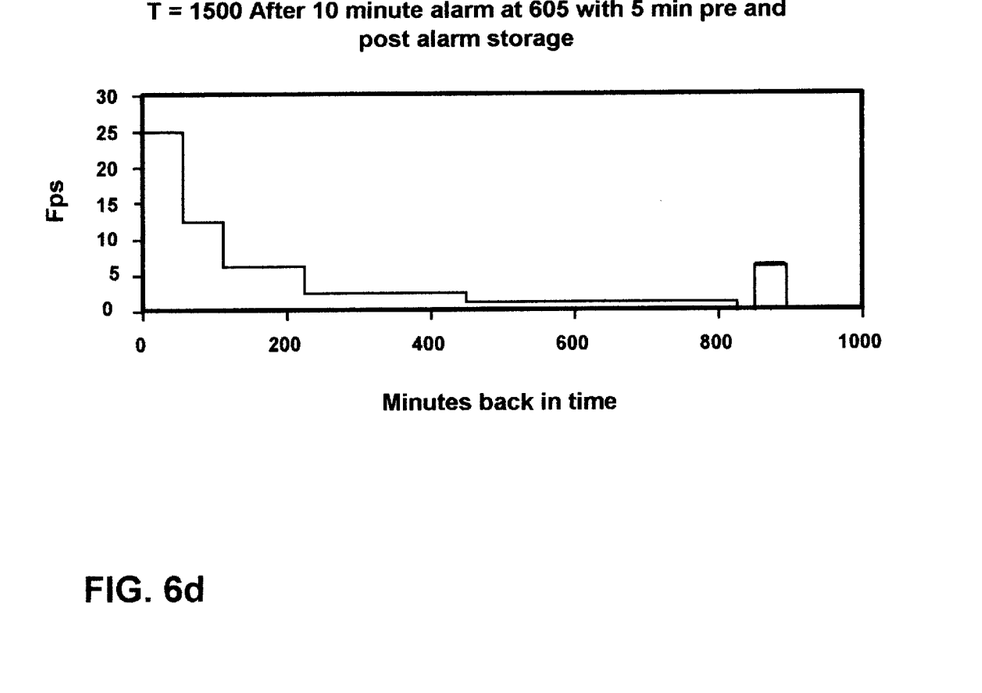
Figure 6E:
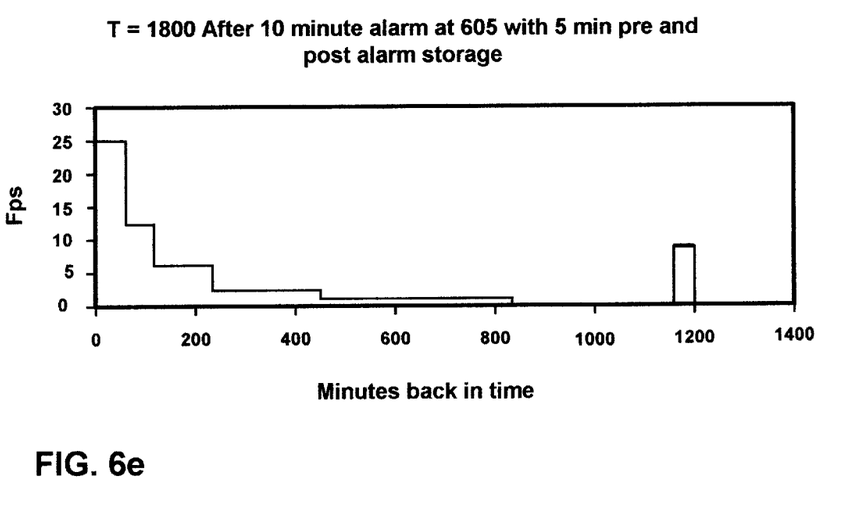

The storage schedule described above is graphically illustrated in FIG. 4.

According to the first embodiment the surveillance performance is further improved by the provision of an alarm settings table defined by the user and administered by module 360. As an example, the alarm settings table may be set to:

| Alarm settings | fps overall during alarm | fps within alarm sequence |
|---|---|---|
| Timezone 1 | 25 | 25 |
| Timezone 2 | 15 | 25 |
| Timezone 3 | 2 | 15 |
| Timezone 4 | 0 | 5 |
| Timezone 5 | 0 | 0 |

As appears from the above table, the surveillance system enters a second mode in response to an alarm event detected by the alarm detector 20 and reported to the alarm handling module 370. In response, the image evaluating module 320, the image selecting module 330 and the image reducing module 340 are operated in a way, such that a higher fps value is used for images within an alarm sequence, which starts e.g. 5 minutes before the occurrence of the actual alarm event and ends e.g. 5 minutes after the alarm event.

An exemplary course of events is illustrated in FIGS. 5a–5e. An alarm event is assumed to have occurred at time T (minutes), and as a consequence the alarm mode described above has been active for 10 minutes around the alarm event. The graphs in FIGS. 5a–5e show the frame rate distribution at T=0 minutes, T=30 minutes, T=120 minutes, T=400 minutes and T=2000 minutes, respectively. The 10-minute alarm sequence is indicated by a thick horizontal line. It is to be observed, that for T=120 and T=400 (FIGS. 5c and 5d), the 2 fps zone ends earlier than before. In other words, in order to store the 10-minute alarm sequence with high quality, the quality of the long-term storage has been reduced by sacrificing the oldest images. In return, the system is capable of storing alarm image information (FIG. 5e) at 5 fps, which is much older than the 1863 minutes limit of FIG. 4.

Second Embodiment

According to a second embodiment the image storage controller is arranged to operate in accordance with an adaptive algorithm, which groups the stored video image data into minutes and determines a factor of importance (weight) or qualitative value for each minute. When some of the storage space of the storage device 50 has to be released, the frame rate is reduced for the least valued minute of video image data. The values of individual minutes of video data are calculated according to the following formula:

$V_n = A_n \cdot F(T)/(T \cdot fps_n)$, where n is a unique identifier for each minute, $V_n$ is a qualitative value of minute n, $A_n$ is an alarm event weight of minute n, F(T) is a time-dependent discrete function, which describes the factor of importance for images of different age, T is the age of the images, i.e. the number of minutes that have lapsed, since the images within the respective minute were created, and $fps_n$ is the current frame rate of the images within the respective minute.

For example, the function F(T) may be set according to the following:

F(T)=100 when T<60,
90 when 60<T<180,
80 when 180<T<600, and
70 when 600<T.

$A_n$ is set to 1 during normal conditions and is set to 8 during alarms and the surrounding pre/post alarm sequence of e.g. 10 minutes.

The image storage controller selects the specific minute of video data, which has the lowest weight $V_n$. For the selected minute of video data, the frame rate (fps) is reduced by 50%, i.e. every second frame is deleted from the selected minute of video data. Once the image quality of the selected minute of video data has been reduced in this way, the weight $V_n$ thereof is doubled, thereby preventing the selected minute of video data from being immediately selected once more and excessively reduced in image quality.

An illustrative course of events is shown in FIGS. 6a–6e. In this example the maximum storage capacity of the storage device 50 is 270,000 frames. Furthermore, when the frame rate for a certain minute has been reduced to a value below 1 fps, the entire image sequence of that minute will be removed.

Third Embodiment

According to a third embodiment the image storage controller 40 is arranged to operate according to the following formula for evaluating the importance of individual images:

$V = W \cdot K_1/$(current time—image creation time), where

V is the current value of the image,

W is the current weight of the image and depends of the status of surrounding images, and $K_1$ is a factor of importance, which describes the time segment to which the image belongs. The factor of importance will be very high, if full video quality is always desired for a given time segment, and the factor of importance will be set to a low value in the least important/oldest time segment.

When an adjacent image is removed, W will be multiplied with a number greater than 1 for the two neighbouring images. The weight W is also used for increasing the importance of certain images. For instance, if an alarm event is detected by the alarm detector 20, frames belonging to a certain period of time prior to the alarm as well as after the alarm will be given a higher W. Furthermore, the user may define certain timezones of high importance. For instance, if the time between 17 p.m. and 24 p.m. is considered as high risk time, the weight W may be increased for images belonging to this period of time.

Fourth Embodiment

A simple but yet effective embodiment is described below, where image quality reduction is performed for individual images rather than groups of images (such as minutes of video data).

For exemplifying reasons, a plurality of images ABCDEFGHI are stored in the storage device, wherein the images have a chronological order and image A is the oldest. Initially, all images AB . . . I are given the same weight 1. The weight is indicated in parenthesis below:

A(1) B(1) C(1) D(1) E(1) F(1) G(1) H(1) I(1)

Now, assuming that the image storage controller has determined a need for sacrificing one of the images, image A is selected, since A is the oldest and all images have equal weight. In response, the weight is doubled for adjacent images, i.e. image B in this case, resulting in the following situation:

B(2) C(1) D(1) E(1) F(1) G(1) H(1) I(1)

The next image to be deleted from the sequence will be C, despite the fact that image B is older. The higher weight of image B outweighs the older age thereof. When image C is deleted, the weight is doubled for adjacent images, i.e. images B and D:

B(4) D(2) E(1) F(1) G(1) H(1) I(1).

The next image to be deleted will be E, and image B will not be deleted until the age thereof outweighs the increased weight of B.

Other Embodiments

As an alternative to the approaches described above, where the required image quality reduction is achieved by reducing the frame rate (fps) for certain image sequences, the image data stored in the storage device so may be reduced by applying any data compression algorithm know per se to the selected images or image sequences. As an example, JPEG compression, MPEG compression, fractal compression or wavelet compression may be used. Normally, the digital images will be compressed to some extent already when they are initially stored in the storage device 50. In such a case, the reduction in image quality involves increasing the compression rate and/or applying a different compression algorithm to such initially compressed images. Alternatively, the quality reduction may be achieved by discarding color information for these selected images, or by reducing the size of individual images by e.g. sacrificing every second pixel within the image.

Advantageously, the camera 30 is connected to the image storage controller 40 and the image storage device 50 via any commercially available computer network. Hence, the camera 30 may be any commercially available network camera known per se.

The invention has been described above by way of a few embodiments. However, other embodiments than the ones described above are equally possible within the scope of the invention, as defined by the appended patent claims.

What is claimed is:

1. A method for storing on a non-volatile storage medium a video input characterized by sequential image frames at an input frame rate of "N" image frames per second, and the method comprising the acts of:

storing the video input at the input frame rate on free-space portions of the non-volatile storage medium;

incrementally reducing a number of stored image frames which span a corresponding second of the video input on portions of the non-volatile storage medium including defining a value $$V_n = \frac{A_n \times F(T)}{T \times fps_n}$$

for the remaining image frames on the non-volatile storage medium where "n" is a unique identifier for each minute of video input, and where "$A_n$" is an alarm event weight of a minute "n", "F(T)" is a time-dependent function defining a factor of importance for image frames of different age, "T" is the age of the image frames, and "$fps_n$" is the current frame rate exhibited by the image frames within the corresponding minute; and deleting remaining ones of the image frames with the lowest value "$V_n$", thereby to generate additional free-space portions for the storing act, whereby at least one portion of the non-volatile storage medium exhibits after such incremental reduction an intermediate frame rate in which the number of remaining image frames which span a corresponding second of stored video input is less than the input frame rate of "N" image frames per second and greater than zero.

2. A method for storing on a non-volatile storage medium a video input characterized by sequential image frames at an input frame rate of "N" image frames per second, and the method comprising the acts of:

storing the video input at the input frame rate on free-space portions of the non-volatile storage medium;

defining a current value for image frames on the non-volatile storage medium with respect to the age of the image, a factor of importance and the history of image frame deletions in the surrounding of each image frame, including defining a current value $$V = \frac{W \times K_i}{CurrentTime - ImageCreationTime}$$

where "W" is the current weight of the image frame which increases as neighboring images are deleted, and "K" is a factor of importance associated with the time segment to which the image belongs; and incrementally reducing the number of stored image frames which span a corresponding period of the video input on portions of the non-volatile storage medium including at least one portion which exhibits after such incremental reduction an intermediate frame rate in which the number of remaining image frames which span a corresponding period of stored video input is less than the input frame rate of "N" image frames per second and greater than zero by deleting image frames with the lowest current value defined in the defining act thereby to generate additional free-space portions for the storing act.

3. A method for storing on a non-volatile storage medium a video input characterized by sequential image frames at an input frame rate of "N" image frames per second, and the method comprising the acts of:

storing the video input at the input frame rate on free-space portions of the non-volatile storage medium;

defining a current value for image frames on the non-volatile storage medium with respect to the age of the image, a factor of importance and the history of image frame deletions in the surrounding of each image frame, including defining a current value $$V_n = \frac{A_n \times F(T)}{T \times fps_n}$$

where "n" is a unique identifier for each minute of video input, "Vn" is the current value for an image frame of minute "n", "$A_n$" is an alarm event weight minute "n", "F(T)" is a time-dependent function defining a factor of importance for image frames of different age, "T" is the age of the image frames, and "$fps_n$" is the current frame rate exhibited by the image frames within the corresponding minute; and incrementally reducing the number of stored image frames which span a corresponding period of the video input on portions of the non-volatile storage medium including at least one portion which exhibits after such incremental reduction an intermediate frame rate in which the number of remaining image frames which span a corresponding period of stored video input is less than the input frame rate of "N" image frames per second and greater than zero by deleting image frames with the lowest current value defined in the defining act thereby to generate additional free-space portions for the storing act.

* * * * *